United States Patent
Terasawa et al.

(10) Patent No.: US 7,218,343 B2
(45) Date of Patent: May 15, 2007

(54) IMAGE SENSING APPARATUS USING A NON-INTERLACE SCANNING TYPE IMAGE SENSING DEVICE

(75) Inventors: Ken Terasawa, Yokohama (JP); Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 10/460,249

(22) Filed: Jun. 13, 2003

(65) Prior Publication Data
US 2003/0210339 A1 Nov. 13, 2003

Related U.S. Application Data

(62) Division of application No. 08/736,259, filed on Oct. 24, 1996, now Pat. No. 6,611,286.

(30) Foreign Application Priority Data

Oct. 27, 1995 (JP) ................................. 7-280879
Jan. 9, 1996 (JP) ................................. 8-001327

(51) Int. Cl.
*H04N 5/225* (2006.01)
*H04N 7/01* (2006.01)
(52) U.S. Cl. .................................... 348/220.1; 348/446
(58) Field of Classification Search .................. None
See application file for complete search history.

(56) References Cited

U.S. PATENT DOCUMENTS

| | | | |
|---|---|---|---|
| 4,720,744 A | 1/1988 | Washi et al. ................. 358/141 |
| 4,924,305 A * | 5/1990 | Nakagawa et al. ......... 348/451 |
| 5,051,832 A | 9/1991 | Losee et al. ............ 358/213.29 |
| 5,070,406 A | 12/1991 | Kinoshita .................... 358/224 |
| 5,083,208 A | 1/1992 | Hatanaka .................... 358/227 |
| 5,175,618 A * | 12/1992 | Ueda et al. ............ 375/240.13 |
| 5,233,411 A | 8/1993 | Nam et al. ..................... 358/75 |
| 5,331,346 A | 7/1994 | Shields et al. ............... 348/441 |
| 5,459,525 A | 10/1995 | Izawa et al. ................ 348/553 |
| 5,874,995 A | 2/1999 | Naimpally et al. ......... 348/384 |
| 6,204,878 B1 * | 3/2001 | Hieda .................... 348/240.99 |
| 6,611,286 B1 * | 8/2003 | Terasawa et al. ........ 348/220.1 |

* cited by examiner

*Primary Examiner*—Lin Ye
*Assistant Examiner*—Luong T. Nguyen
(74) *Attorney, Agent, or Firm*—Morgan & Finnegan, LLP

(57) ABSTRACT

In an image sensing apparatus using a non-interlace scanning type image sensing element, image data as well as a signal indicating whether the image data is sensed in a mode which is suitable for sensing a moving image (field image sensing mode) or sensed in a mode which is suitable for sensing a still image (frame image sensing mode) are recorded in a recording medium. In reproducing the image data from the recording medium, in a case where the recorded image data is sensed in the frame image sensing mode and a moving image output is required, an interpolation filter controller controls an interpolation filter to generate and output field images interpolated between consecutive frame images on the basis of the reproduced even or odd line field image data of the two consecutive frame images, thereby obtaining a smooth moving image.

8 Claims, 16 Drawing Sheets

IMAGE SENSING APPARATUS USING A NON-INTERLACE SCANNING TYPE IMAGE SENSING DEVICE

CROSS-REFERENCE TO RELATED APPLICATION

This is a divisional application under 37 C.F.R. §1.53(b) of U.S. patent application Ser. No. 08/736,259, filed on Oct. 24, 1996 now U.S. Pat. No. 6,611,286, which is incorporated herein by reference in its entirety.

BACKGROUND OF THE INVENTION

The present invention relates to an image sensing apparatus and, more particularly, to an image sensing apparatus, using a non-interlace scanning type image sensing device, capable of encoding image data obtained by the image sensing device in accordance with movement of an object sensed, and outputting a smooth moving image when reproducing image data recorded on a recording medium.

Recently, a non-interlace scanning type image sensing device capable of sequentially reading signals of all the pixels has been developed with the progress of semiconductor manufacturing technique.

The non-interlace scanning type image sensing device has an advantage in that a higher resolution image can be obtained with less blurring than an image sensed by using a conventional interlace scanning type image sensing device even when sensing a moving object.

In the interlace scanning type image sensing device, a frame image is composed of two field images which are sensed at different times, usually at a field period interval. Accordingly, there is a problem in which, when sensing a fast moving object, there are notches on edges of the object and perhaps of the background in a frame image because of the time gap between the two field images composing a frame image.

If a frame image is made of image data of a single field image to overcome the aforesaid problem, there would not be notches on edges, however, since the amount of image information in the vertical direction is halved compared to a frame image composing of two field images, the vertical resolution of the obtained frame image is also halved.

In contrast, with a non-interlace scanning type image sensing device, it is possible to sense a frame image in the same time period as that for sensing a field image by an interlace scanning type image sensing device, thus, the above problem does not arise. By taking this advantage of the non-interlace scanning type image sensing device, it is applied to a still image camera and an input device for use with a computer, for example.

Further, in a still image output device, such as a video printer, which has rapidly spread in the market in these days, a user can arbitrary pick up a desired scene out of images which are sensed as a moving image. Accordingly, there is a demand to use the non-interlace scanning type image sensing device as an image sensing unit of a video camera capable of sensing both a moving image and a still image.

When a non-interlace scanning type image sensing device is used as an image sensing unit of a video camera capable of sensing both a moving image and a still image, as described above, a couple of methods for generating moving image signals can be considered.

A case where a non-interlace scanning type image sensing device is used in a digital video camera of NTSC standard, as shown in FIG. 7, will be explained as an example. A non-interlace scanning type image sensing device 1 has a structure to output signals by two channels, and each channel always outputs either image signals of even lines or image signals of odd lines of the non-interlace type image sensing device 1.

Further, in FIG. 7, image signals of the even lines and odd lines are alternatively outputted from each channel of the non-interlace scanning type image sensing device 1 in each field period in accordance with timing signals generated by a timing signal generator (TG) 15. For example, referring to one of the two output channels, when image signals of even lines are outputted from one of the channel in a given field period, image signals of odd lines are outputted in the next field period, then image signals of even lines are outputted in the following field period. Image signals read out from the non-interlace scanning type image sensing device 1 are respectively inputted to correlated double sampling (CDS) circuits 201 and 202. The signals outputted from the CDS circuits 201 and 202 are inputted to automatic gain controllers (AGCs) 301 and 302, thereafter enter analog-digital (A/D) converters 401 and 402, respectively.

Then, after the analog signals are converted into digital signals by the A/D converters 401 and 402, enter a camera signal processing circuit 5. The camera signal processing circuit 5 performs signal processes, such as color separation, edge enhancement, and color correction, after the image data of the even lines and odd lines are applied with dot sequential processing.

After the aforesaid processes are completed, the camera signal processing circuit 5 divides a frame image, and image data of one field (e.g., image data of even lines) is outputted from the first channel ch1, and image data of the other field (e.g., image data of odd lines) is outputted from the second channel ch2. Similarly, for the next frame image, image data of alternate fields are outputted from the first and second channels ch1 and ch2. For example, image data of odd lines is outputted from the first channel ch1, and image data of even lines is outputted from the second channel ch2.

The non-interlace scanning type image sensing device 1 can generate a frame image in one field period, however, a recording device (e.g., a digital VTR) can record only a field image in one field period.

Accordingly, as shown in FIG. 8A, by using either the image signals outputted from the first channel ch1 or the image signals outputted from the second channel ch2, an image of a single field is outputted in each field period (a mode for performing the aforesaid operation is called "field image sensing mode", hereinafter).

Referring to FIG. 8A, the camera signal processing circuit 5 sequentially writes field image data of a first frame image #1 and of a second frame image #2 outputted from the first channel ch1 to a first frame memory 601 in the first and second field periods in accordance with a control signal C1.

Meanwhile, if image data is written in a second frame memory 602, the image data of one previous frame period is sent to an encoding processing circuit 7 in accordance with a control signal C2. In the encoding processing circuit 7, the image data is applied with processes, such as discrete cosine transform (DCT) and shuffling, thereafter, stored in a magnetic tape 9 by a recording head 8 as digital image signals in a recording method complying with a format.

After image data of one frame is written in the first frame memory 601, the camera signal processing circuit 5 sequentially writes field image data of the third frame image #3 and of the fourth frame image #4 outputted from the first channel ch1 to the second frame memory 602 in the third and fourth field periods in accordance with the control signal C2.

Meanwhile, the image data of one previous frame period is sent to the encoding processing circuit 7 in accordance with a control signal C2. In the encoding processing circuit 7, the image data is applied with the same processes as described above, thereafter, stored in the magnetic tape 9 by the recording head 8 as digital image signals in the recording method complying with the format.

The image signals which are recorded as above is processed as shown in FIG. 8B when they are reproduced. First, the image signals read from the magnetic tape 9 by the read head 10 are sent to a decoding processing circuit 11 in the first and second field periods, and applied with signal processes, such as inverse discrete cosine transform (I-DCT) and de-shuffling. Thereafter, the image signals are written to a third frame memory 121 in accordance with a control signal C3.

Meanwhile, if image data is written in a fourth frame memory 122, the decoding processing circuit 11 reads image data from the fourth memory 122 in accordance with a control signal C4, and reproduces an image by an even line field and an odd line field separately.

In the third and fourth field periods, the image signals read from the magnetic tape 9 by the read head 10 are transmitted to the decoding processing circuit 11 where the image signals are applied with the I-DCT, deshuffling, and so on, then written to the fourth frame memory 122.

Meanwhile, the decoding processing circuit 11 reads image data from the third memory 121 in accordance with the control signal C3, and reproduces an image of the even line field and the odd line field separately.

In the decoding processing circuit 11 used in the aforesaid conventional example, image signals outputted from the first channel ch1 and the second channel ch2 are of the even line field and the odd line field of the non-interlace scanning type image sensing device 1, shown in FIG. 10. Therefore, the field image sensing mode can be used for moving image sensing operation.

However, according to the aforesaid example, the vertical resolution is about the same as that of a conventional image sensing device which outputs image data after adding charges stored in two adjacent pixels in the vertical direction. Accordingly, when outputting an image of a moving object obtained by using the non-interlace scanning type image sensing device 1 in the field image sensing mode as a still image from a video printer, or the like, only a poor still image can be obtained because of blurring.

Thus, as a method of effectively using an advantage of the non-interlace scanning type image sensing device, i.e., to output a frame image in a field period, the one shown in FIG. 9A has been suggested.

In this case, the camera signal processing circuit 5 writes field image data of the even line field of the frame image #1 outputted from the first channel ch1 and field image data of the odd line field of the frame image #1 outputted from the second channel ch2 to the first frame memory 601 in the first and second field periods, respectively, in accordance with the control signal C1.

Then a frame image #2 sensed in the second field period is not stored, and the first frame image sensed in the first field period is used as a moving image of a frame period (this image sensing operation is called "frame image sensing mode", hereinafter).

Meanwhile, if image data has been written in the second frame memory 602, the image data of one previous frame is sent to the encoding processing circuit 7 in accordance with the control signal C2 and processed with DCT, shuffling, and so on. Thereafter, the processed image data is recorded as digital image signals on the magnetic tape 9 by the recording head 8 in a recording method complying with a format.

When image data of a single frame is written in the first frame memory 601, the camera signal processing circuit sequentially writes even line field image data of the third frame image #3 outputted from the first channel ch1 and odd line field image data of the third frame image #3 outputted from the second channel ch2 to the second frame memory 602 in the third and fourth field periods in accordance with the control signal C2.

Meanwhile, the image data of one previous frame written in the first frame memory 601 is send to the encoding processing circuit 7 where it is applied with the same processes as described above, then recorded on the magnetic tape 9 by the recording head 8 in a recording method complying with a format as digital image signals.

The image signals recorded as described above are applied with processes as shown in FIG. 9B when they are reproduced. First, the image signals read from the magnetic tape 9 by the read head 10 are transmitted to the decoding processing circuit 11 where they are processed with I-DCT, deshuffling, and so on. Then, the image signals are written to the third frame memory 121 in accordance with the control signal C3 in the first and second field periods.

Meanwhile, if image data is written in the fourth frame memory 122, the decoding processing circuit 11 reads image data from the fourth memory 122 in accordance with the control signal C4, and reproduces an image by an even line field and an odd line field separately.

In the third and fourth field periods, the image signals read from the magnetic tape 9 by the read head 10 are transmitted to the decoding processing circuit 11 where they are applied with the I-DCT, deshuffling, and so on. Thereafter, the images are written to the fourth frame memory 122 in accordance with the control signal C4.

Meanwhile, the decoding processing circuit 11 reads image data from the third memory 121 in accordance with the control signal C3, and reproduces an image using the even line field and the odd line field separately.

In this method, it is possible to store an image of high resolution without blurring when sensing a moving object. Therefore, the method can be used when sensing a still image. However, when the stored image data is reproduced as a moving image, image data of fields as shown in FIG. 9B is outputted, thus the displayed image is of frame images sensed in frame period. In this method, therefore, it is possible to obtain an image of high resolution, however, when the image data of a faster moving object is reproduced as a moving image, for example, the displayed image has gaps in time and only a poor moving image can be obtained.

The present invention is addressed to solve this problem.

Further, as the digital signal processing technique improves, many image sensing apparatuses adopting digital recording and reading technique in the recording and reproducing unit have been proposed. In these image sensing apparatuses, image signals are compressed and encoded as well as modulated to a format suitable for digital recording in a recording unit, then recorded in a data storage medium. Further, when reproducing image signals, read data is demodulated and decoded in a process in opposite to the recording process, then outputting reproduced image signals.

FIG. 11 is a block diagram illustrating a configuration of a conventional image sensing apparatus. In FIG. 11, reference numeral 501 denotes an image sensing unit whose focus, zoom ratio, and iris diaphragm, and so on, are controlled by an image sensing controller 503, and which generates known digital standard image data S1$p$, such as parallel data conforming with SMPTE (Society of Motion Picture and Television Engineers) 125M.

A block division unit 502 divides the digital image data S1$p$ into blocks consisting of a plurality of pixels, further applies processes, such as shuffling and noise reduction, on the divided digital image data.

The image data S2$p$ divided into a plurality of blocks by the block division unit 502 is provided to a motion detector (MD) 505.

The MD 505 generates information S3$p$ on movement of image data on the basis of the input image data S2$p$ and outputs it to a system controller 509. The MD 505 detects movement in an image by detecting differences between field image data of each image blocks.

Reference numerals 506 and 507 denote discrete cosine transform (DCT) units which compress information by using correlation between neighboring pixels of the image data. The first DCT unit 506 performs DCT on image data by an area, e.g., 8×8 pixel block, of a frame image.

Further, the second DCT unit 507 performs DCT on image data by an area, e.g., by 8×4 pixel block, of an odd line field image, and 8×4 pixel block of an even line field image.

The system controller 509 outputs a switching signal S4$p$ in accordance with information on movement, thereby controls a switch 508 to switch between the first DCT unit 506 and the second DCT unit 507.

Here, in a case where no movement is detected in the block image data S2$p$, in other words, movement determination information S3$p$ shows "not moving", the switch 508 switches to the terminal 508$a$. In contrast, in a case where movement is detected in the block image data S2$p$, i.e., the movement determination information S3$p$ shows "moving", the switch 508 switches to the terminal 508$b$. Thus, DCT processes can be switched for a frame image and for a field image in accordance with the movement determination information S3$p$.

In a case where there is a large movement in the block image data S2$p$, since correlation between fields is low, vertical components of the DCT coefficients reach high frequency range if an image is processed as a frame image, and encoding efficiency drops extremely.

Therefore, when the movement determination information S3$p$ shows "moving", it is controlled so that odd line field image data and even line field image data are separately applied with orthogonal transformation. As described above, by properly switching the DCT between the one for a frame image and the one a field image in accordance with a state, "moving" or "not moving" shown by the movement determination information S3$p$, effective encoding is performed.

Data S5$p$ processed with the DCT by the first DCT unit 506 or the second DCT unit 507 is quantized by a quantization unit 510. Processes at each step of quantization are adjusted in accordance with the precision of the image data, and an image of low frequency is quantized closely, whereas an image of high frequency is quantized roughly.

This is because distinguishable ability of human eyes is keen for an image of low frequency, in contrast, it is dull for an image of high frequency. Therefore, by quantizing image data of low frequency range closely and image data of high frequency range roughly, distortion of an image caused by the quantization is concentrated on the high frequency components, thereby reducing deterioration of a visual image quality.

An encoding unit 511 scans the block data arranged in two dimension in zig-zag scanning from the low space frequency portion to the high space frequency portion to obtain linear data, encodes zero coefficients by run-length coding and non-zero coefficients by two dimensional Huffman coding into variable length codes, then outputs encoded data S6$p$.

In the run-length coding, image data is applied with lossless compression in accordance with a zero-run count. In the Huffman coding, short codes are assigned to data whose occurrence probability is high, whereas long codes are assigned to data whose occurrence probability is low, thereby shortening the total code length.

A flag controller 512 is for generating a system information flag S7$p$ used when writing information outputted from the system controller 509 to a recording medium.

In an image sensing apparatus adopting digital recording and reading technique, not only a moving image but also a still image can be recorded in high precision. Further, it is possible to record a still image of high precision (still image recording mode) while recording a moving image (moving image recording mode) depending upon an image sensing mode.

The conventional image sensing apparatus as described above determines movement based on correlation of block image data between fields, a proper DCT method performed by frame or by field is selected on the basis of the detected result.

However, upon sensing and recording a still image of high precision by using a progressive or non-interlace scanning type CCD, since information on the vertical resolution of the image contains higher frequency components than that of an image sensed by using an interlace scanning type CCD, it becomes very difficult to determine movement. For example, when a fine stripe pattern is in an image and differences between even line field data and odd line field data of the image are calculated to be used for detecting movement, since the differences between the field data would be large because of the high vertical resolution, there would be more chance for the image to be misjudged as a moving image. Accordingly, there are more cases in which a still image is misjudged as a moving image, thereby encoding efficiency drops.

The present invention is also addressed for solving the above problem.

SUMMARY OF THE INVENTION

The present invention has been made in consideration of aforesaid situation, and has as its object to obtain a moving image of natural movement and of high resolution even in a case where frame images are recorded by using a non-interlace or progressive scanning type image sensing device.

According to the present invention, the foregoing object is attained by providing an image sensing apparatus which has a reproduction function comprising:

image sensing means for generating image signals by sequentially reading all the pixels of the image sensing means in non-interlace scanning in one field period; camera signal processing means for generating first image signals and second image signals based on television signal standard; output signal selection means for selecting the first image signals or the second image signals outputted by the camera signal processing means; signal recording means for recording a type signal showing a type of the image signals selected by the output signal selection means in a sub-cord recording area of a recording medium;

an interpolation filter for interpolating image data between consecutive images sensed at different times; and interpolation filter control means for controlling whether or not to perform interpolation of image data using the interpolation filter, wherein, when the type signal recorded in the sub-cord recording area indicates a frame image sensing mode in which frame images are sensed in every other field period and the first image signals are recorded in a given field period and the second image signals are recorded in the next field period, and when the sensed image signals are to be outputted as a moving image, the interpolation filter control means controls the interpolation filter to perform interpolation of image data.

According to the aforesaid configuration, when a moving image is sensed in the frame image sensing mode which is essentially suitable for still image sensing, by interpolating field images between consecutive frame images sensed at different times, it is possible to make a moving image continue smoothly. Therefore, if all the recorded image data is of still frame images, it is possible to display it as a moving image of high resolution continuing naturally.

It is another object of the present invention to prevent drop of coding efficiency caused by misdetection of movement in a still image when coding the still image of high precision obtained by non-interlace scanning.

According to the present invention, the foregoing object is attained by providing an image sensing apparatus comprising: image sensing means for generating image signals by sequentially reading all the pixels of the image sensing means in non-interlace scanning in one field period; image sensing mode selection means for selecting an image sensing mode performed by the image sensing means out of a plurality of image sensing modes; and movement determination means for performing movement determination processes in accordance with the image sensing mode selected by the image sensing mode selection means.

With the aforesaid configuration, upon sensing an image by using an image sensing device which sequentially outputs signals generated at each pixel without adding the signals, movement is detected in accordance with the image sensing mode, i.e., a moving image sensing mode or a still image sensing mode. Thereby, it is possible to reduce a chance to misdetect the movement in a still image caused by different features between the moving and still image sensing modes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
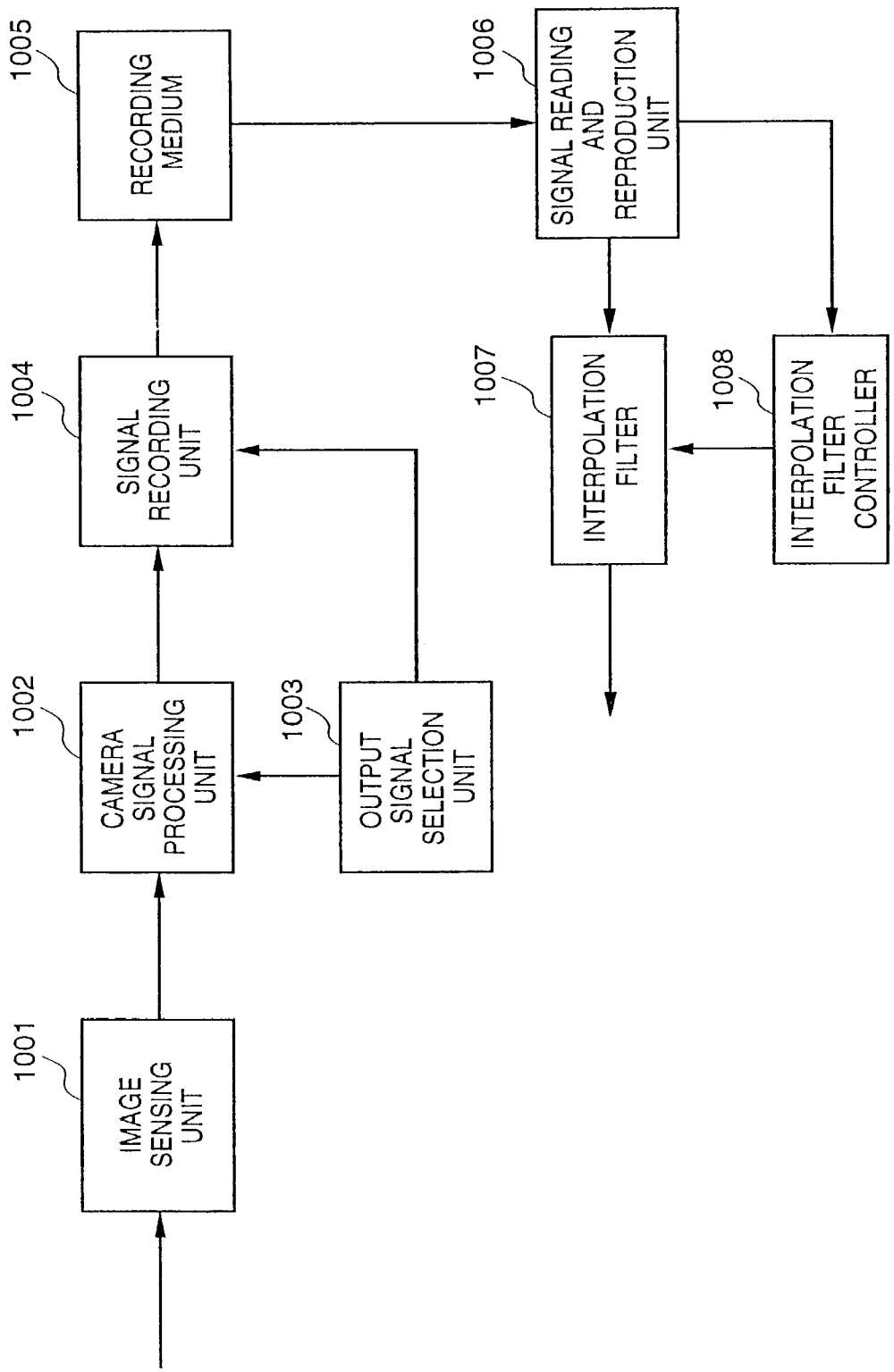
FIG. 1 is a block diagram showing main functions of an image sensing apparatus according to the first embodiment of the present invention.

FIG. 1 is a block diagram illustrating a brief configuration of an image sensing apparatus according to the first embodiment of the present invention. In FIG. 1, reference numeral 1001 denotes an image sensing unit; 1002, a camera signal processing unit; 1003, an output signal selection unit; 1004, a signal recording unit; 1005, a recording medium; 1006, a signal reading and reproduction unit; 1007, an interpolation filter; and 1008, an interpolation filter controller.

The image sensing unit 1001 has a non-interlace scanning type image sensing device, and sequentially reads out signals of each pixel and generates image signals.

The camera signal processing unit 1002 generates first image signals and second image signals conforming to television standard from the image signals outputted from the image sensing unit 1001.

The output signal selection unit 1003 selects either the first image signals or the second image signals outputted from the camera signal processing unit 1002 to be recorded.

The signal recording unit 1004 records the type of the image signals selected by the output signal selection unit 1003 in a sub-cord recording area (not shown) of the recording medium 1005 as a sub-cord signal.

The signal reading and reproduction unit 1006 reads signals recorded on the storage medium 1005 and applies predetermined signal processes on them, and outputs the reproduced image signals to the interpolation filter 1007 as well as outputs the sub-cord signal stored in the sub-cord recording area to the interpolation filter controller 1008.

A signal recorded in the sub-cord recording area of the recording medium 1005 is either of the following two types: one is the field image sensing mode in which, out of image signals of a frame image obtained in a field period, image signals corresponding to the even line field or the odd line field of the image sensing unit 1001 are recorded in a field period; or the other is the frame image sensing mode in which, out of image signals of a frame image obtained in a field period, image signals corresponding to the even line field or the odd line field of the image sensing unit 1001 are recorded in a given field period and image signals corresponding to other field are recorded in the next field period.

The interpolation filter 1007 is for interpolating field images between consecutive frame images sensed at different times in accordance with the sub-cord signal stored in the sub-cord area of the recording medium 1005.

The interpolation filter controller 1008 controls the ON and OFF state of the interpolation filter 1007 in accordance with the sub-cord signal stored in the subcord recording area of the recording medium 1005.

Figure 12:
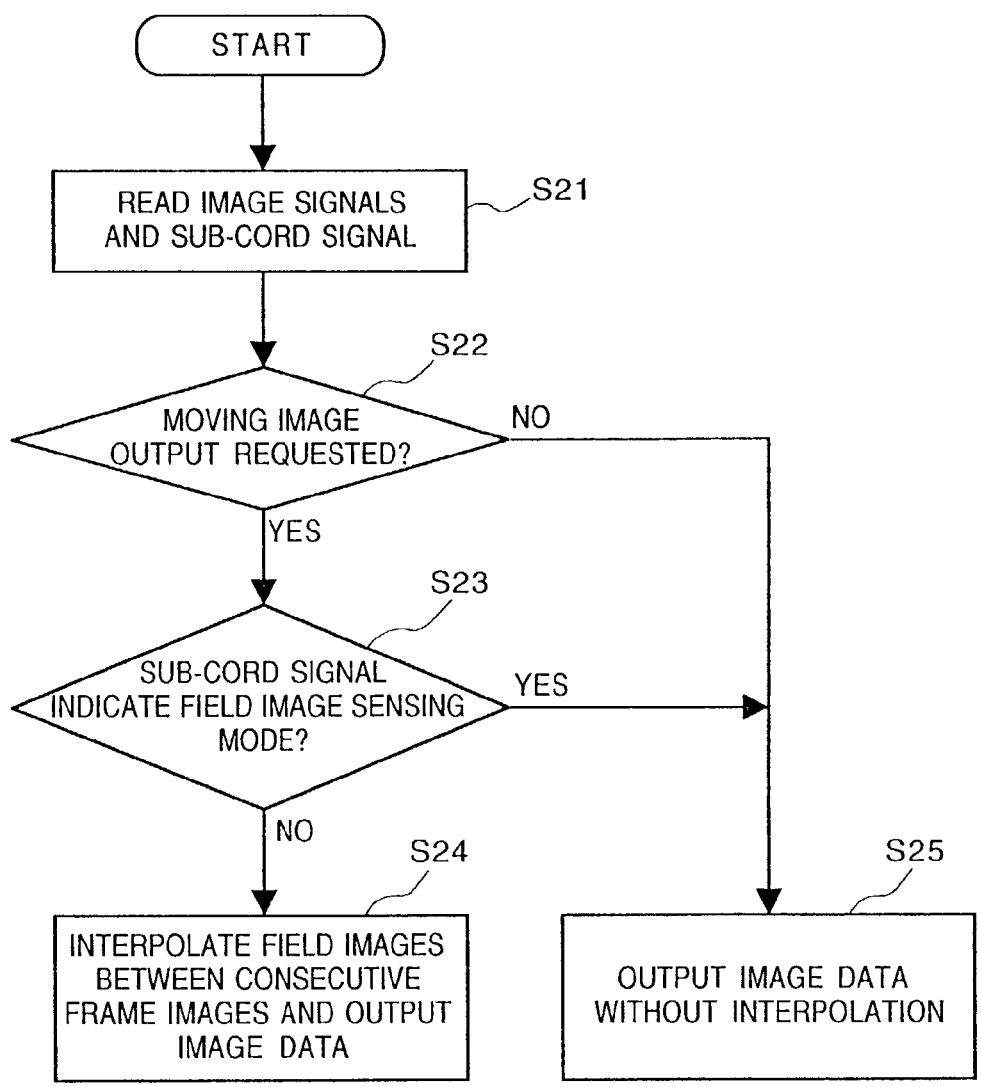
FIG. 12 is a flowchart showing an operation of image reproduction performed by the image sensing apparatus according to the first embodiment of the present invention.

Referring to FIG. 12, a brief operation of reproduction performed by the image sensing apparatus having the aforesaid configuration will be explained below. First at step S21, image signals and sub-cord signal stored in the recording medium 1005 are read out. When moving image output is requested (YES at step S22), the process proceeds to step S23. If the sub-cord signal shows the frame image sensing mode (NO at step S23), the interpolation filter 1007 is turned ON and field images are interpolated between consecutive frame images sensed at different times (this operation will be explained later in detail) (step S24). Whereas, if the sub-cord signal shows the field image sensing mode (YES at step S23), the interpolation filter 1007 is turned OFF (step S25). In contrast, when still image output is designated, regardless of which image sensing mode the sub-cord signal shows, the interpolation filter 1007 is turned off (step S25).

According to the image sensing apparatus having the aforesaid configuration, when images are sensed in the frame image sensing mode which is basically a mode for sensing a still image, it is possible to output the recorded images as a smooth and continuous moving image by interpolating field images between consecutive frame images sensed at different times by the interpolation filter 1007.

Thus, if all the image data recorded on the recording medium 1005 is of frame still images, it is possible to reproduce a moving image of high resolution which moves naturally.

Note, in a domestic use digital TVR standard, a moving image mode and a still image mode are set, and these modes can be distinguished from each other when reproducing recorded images by recording a signal showing whether a still image is recorded or a moving image is recorded when recording images on a recording medium (e.g., a magnetic tape). Thus, the sub-cord signal is merely for distinguishing either the still image mode or the moving image mode when reproducing the image signals.

A more detailed configuration and operation of the image sensing apparatus according to the first embodiment of the present invention will be described with reference to drawings.

Figure 2:
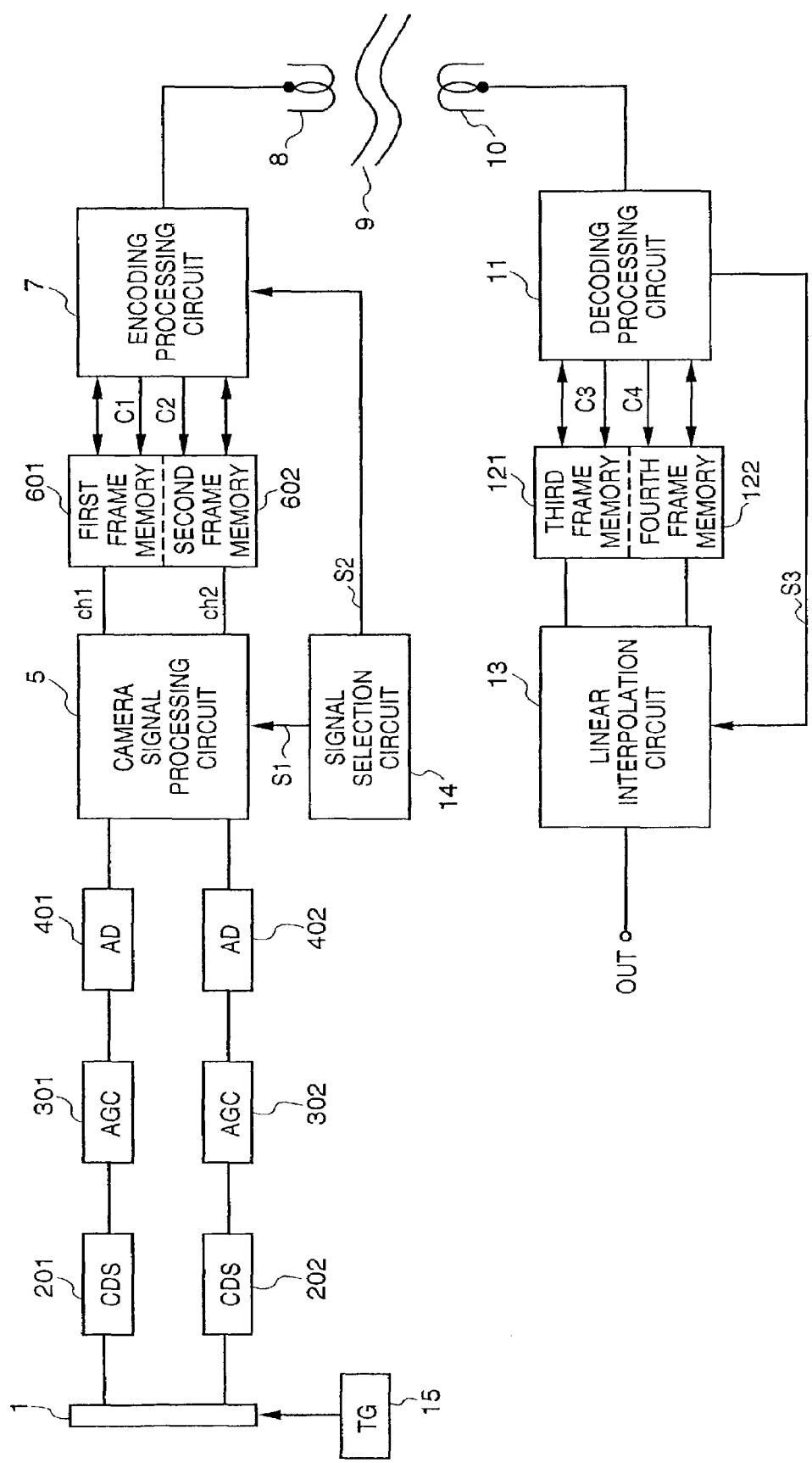
FIG. 2 is a block diagram illustrating a configuration of the image sensing apparatus according to the first embodiment of the present invention.
Figure 7:
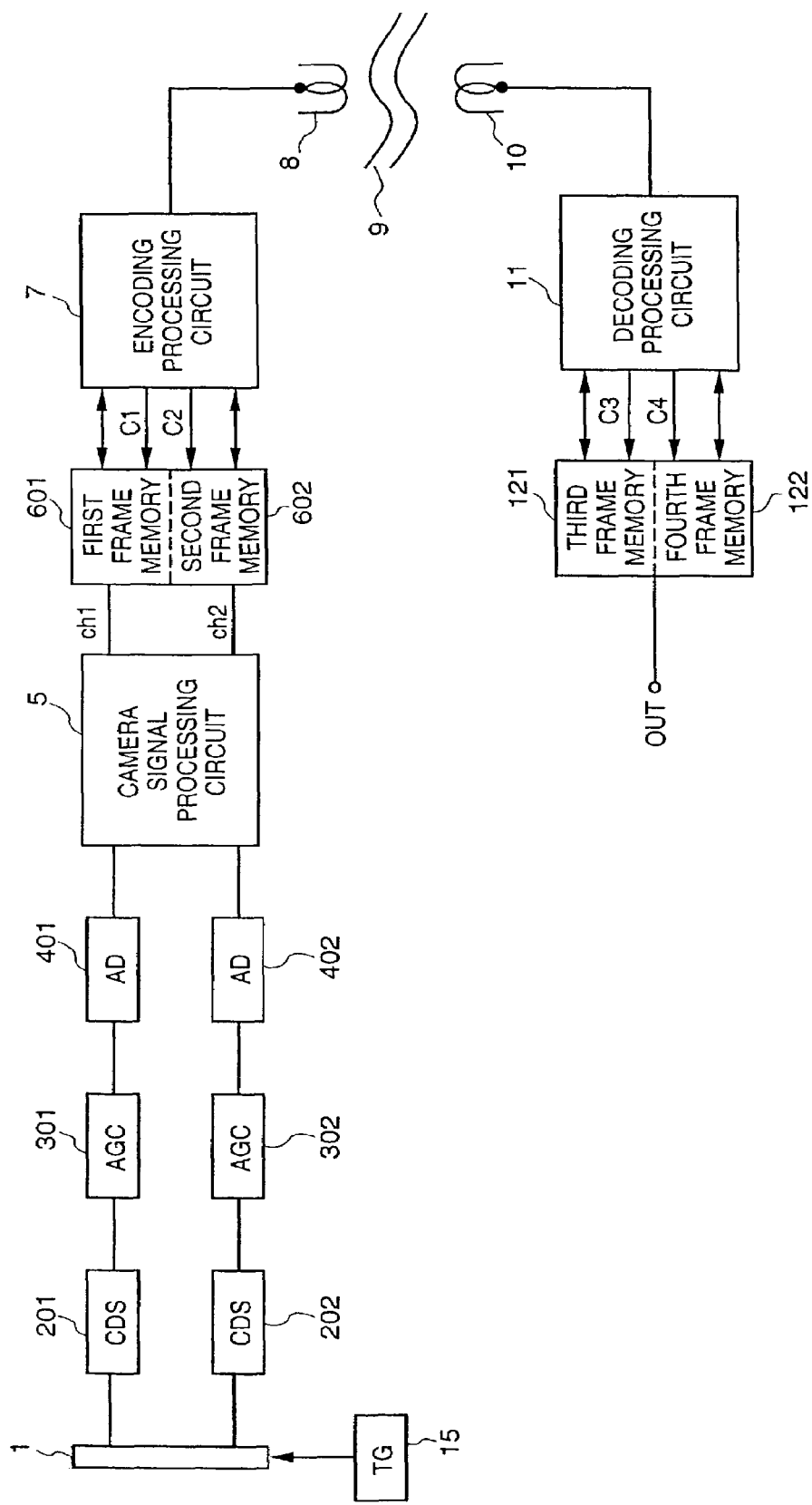
FIG. 7 is a block diagram illustrating a configuration of a conventional image sensing apparatus.

FIG. 2 is a block diagram showing a configuration of the image sensing apparatus of the first embodiment. In FIG. 2, the same units and elements as those in FIG. 7 showing the conventional image sensing apparatus are referred by the same reference numerals and explanation of those are omitted. The non-interlace scanning type image sensing device 1 has a structure to output signals by two channels, and each channel always outputs either image signals of even lines or image signals of odd lines of the non-interlace type image sensing device 1. Further, the recording and reproducing unit is a digital VTR, for instance.

The image signals of the even lines and odd lines are alternatively outputted from each channel of the non-interlace scanning type image sensing device 1 in each field period in accordance with timing signals generated by the TG 15. Image signals read out from the non-interlace scanning type image sensing device 1 are respectively inputted to the correlated double sampling (CDS) circuits 201 and 202. These CDS circuits 201 and 202 perform correlated double sampling for removing a clock and reset noises from the image signals outputted from the non-interlace scanning type image sensing device 1.

The image signals applied with predetermined signal processes by the CDS circuits 201 and 202 enter the AGCs 301 and 302 where their gains are controlled. Thereafter, the image signals enters the A/D converters 401 and 402 where the image signals are converted into digital signals.

The camera signal processing circuit 5 receives the digital signals from the A/D converters 401 and 402, in turn, performs point sequential operation on the even line field image signals and odd line field image signals, further performs signal processes, such as color separation, edge enhancement, and color correction.

A signal selection circuit 14 selects whether the image data to be transmitted to the encoding processing circuit 7 is of signals sensed in the field image sensing mode or signals sensed in the frame image sensing mode in accordance with an image sensing mode set by a mode switch (not shown). Further, the signal selection circuit 14 transmits a control signal S1 to the camera signal processing circuit 5. At the same time, the signal selection circuit 14 generates a sub-cord signal S2 and outputs it to the encoding processing circuit 7.

The control signal S1 is transmitted to be used for selecting processes, either processes for the frame image sensing mode or processes for the field image sensing mode, performed by the camera signal processing circuit 5 in the first embodiment. Detailed explanation of the control signal S1 is omitted here.

Figure 8A:
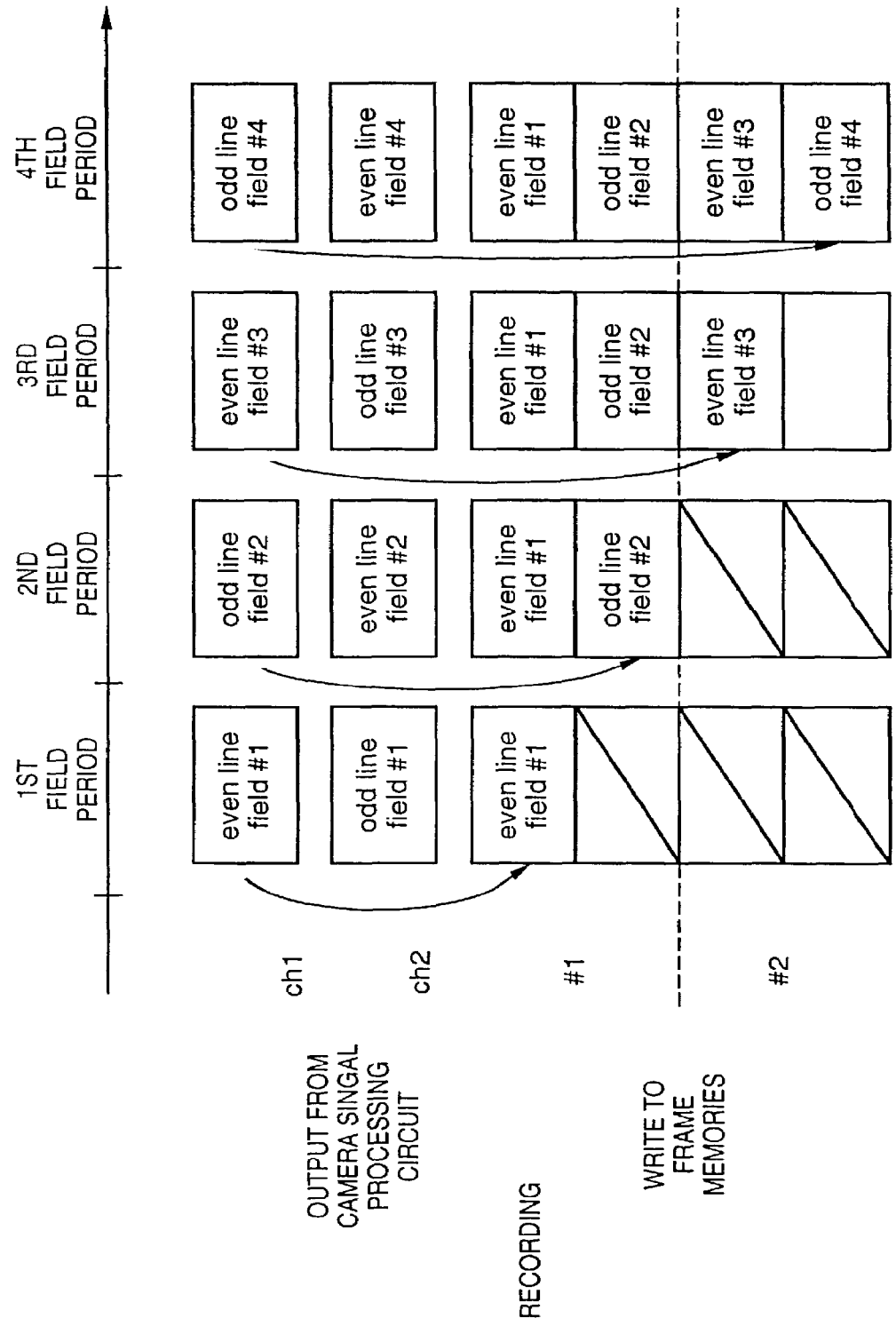
FIGS. 8A and 8B are explanatory views showing operations of the conventional image sensing apparatus.
Figure 8B:
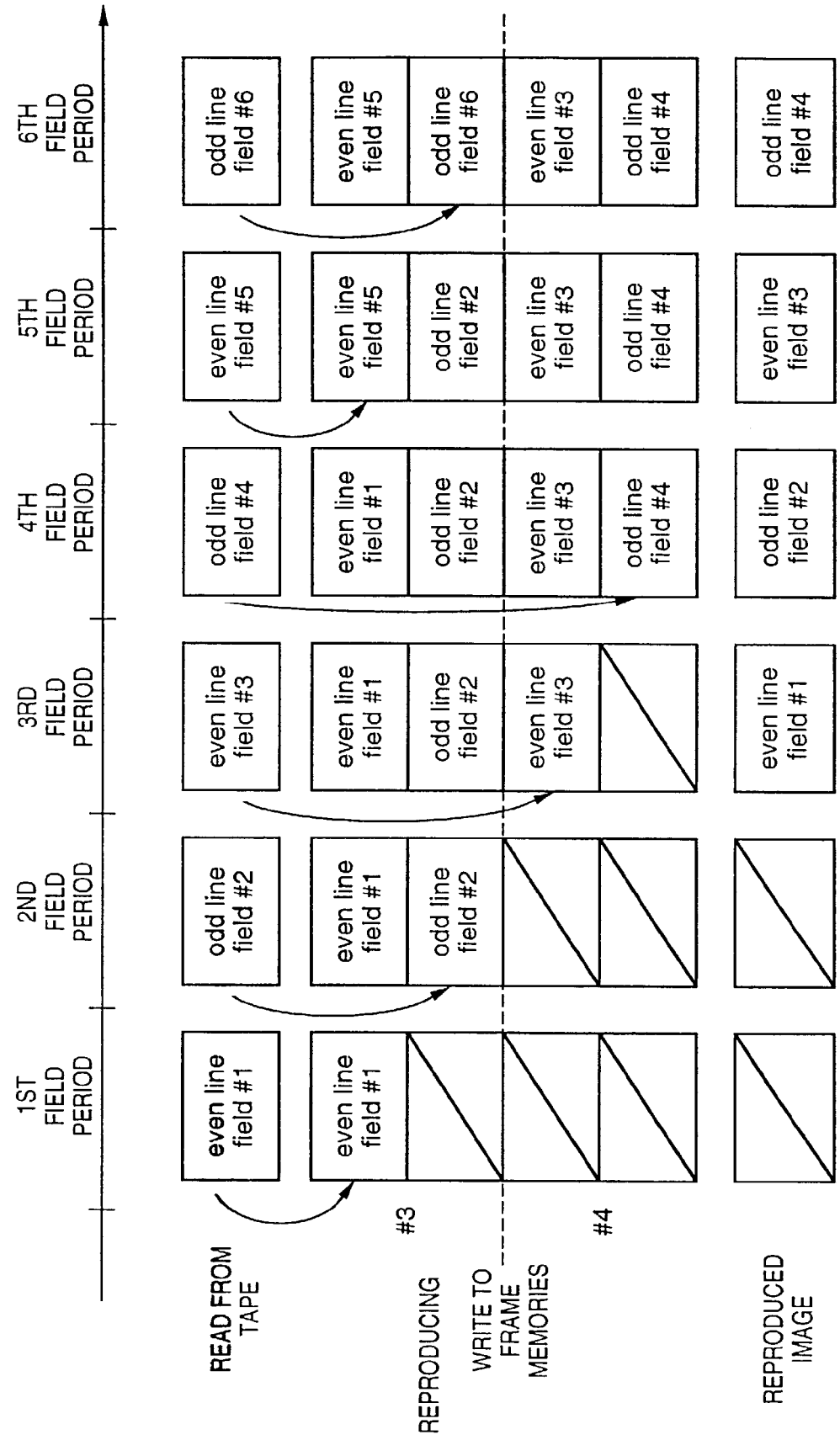

When both the control signal S1 and the sub-cord signal S2 show the field image sensing mode, the processes in field image sensing mode which are explained with reference to FIGS. 8A and 8B are performed. Therefore, the explanation of the processes are omitted here.

Figure 9A:
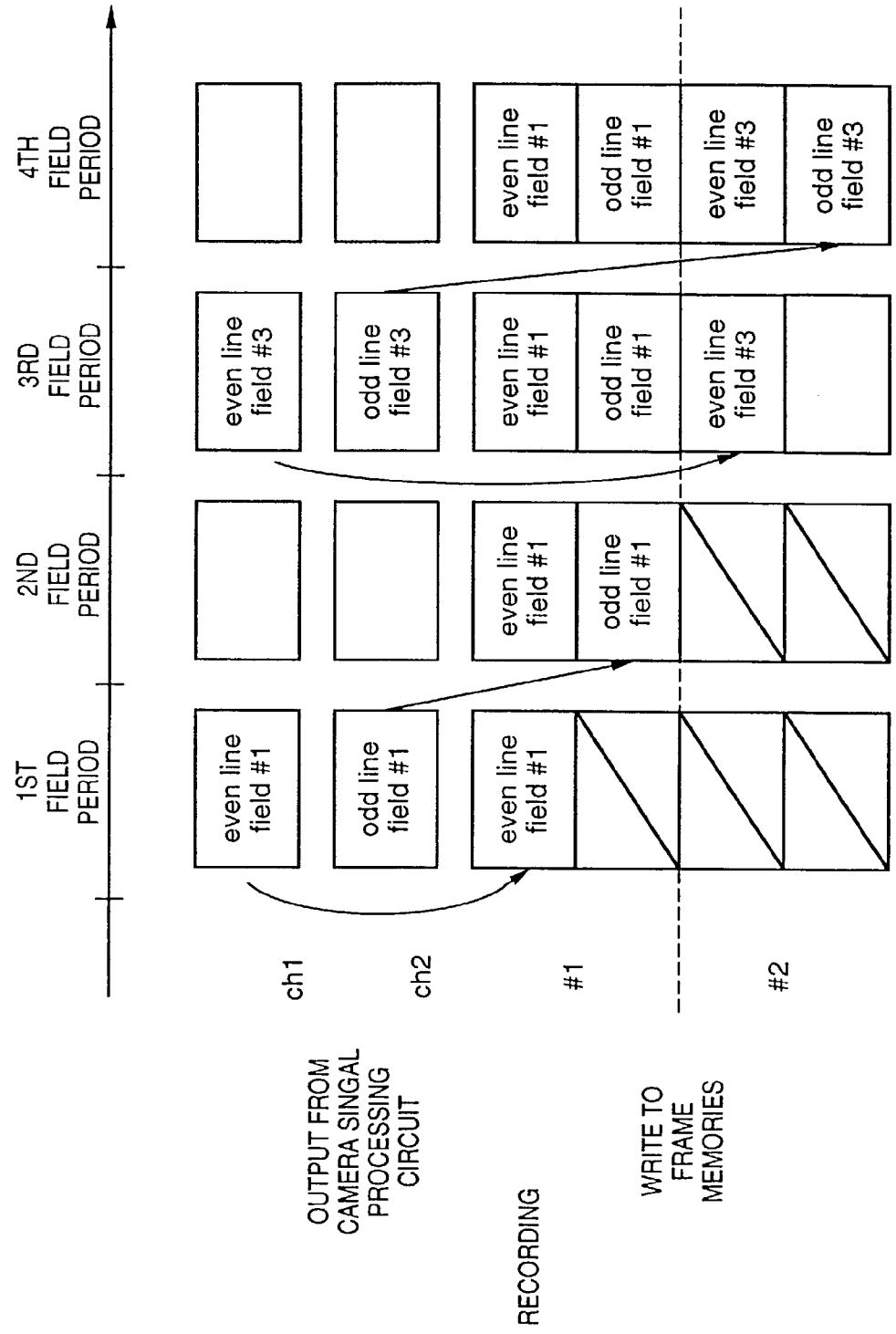
FIGS. 9A and 9B are explanatory views showing operations of the conventional image sensing apparatus.
Figure 9B:
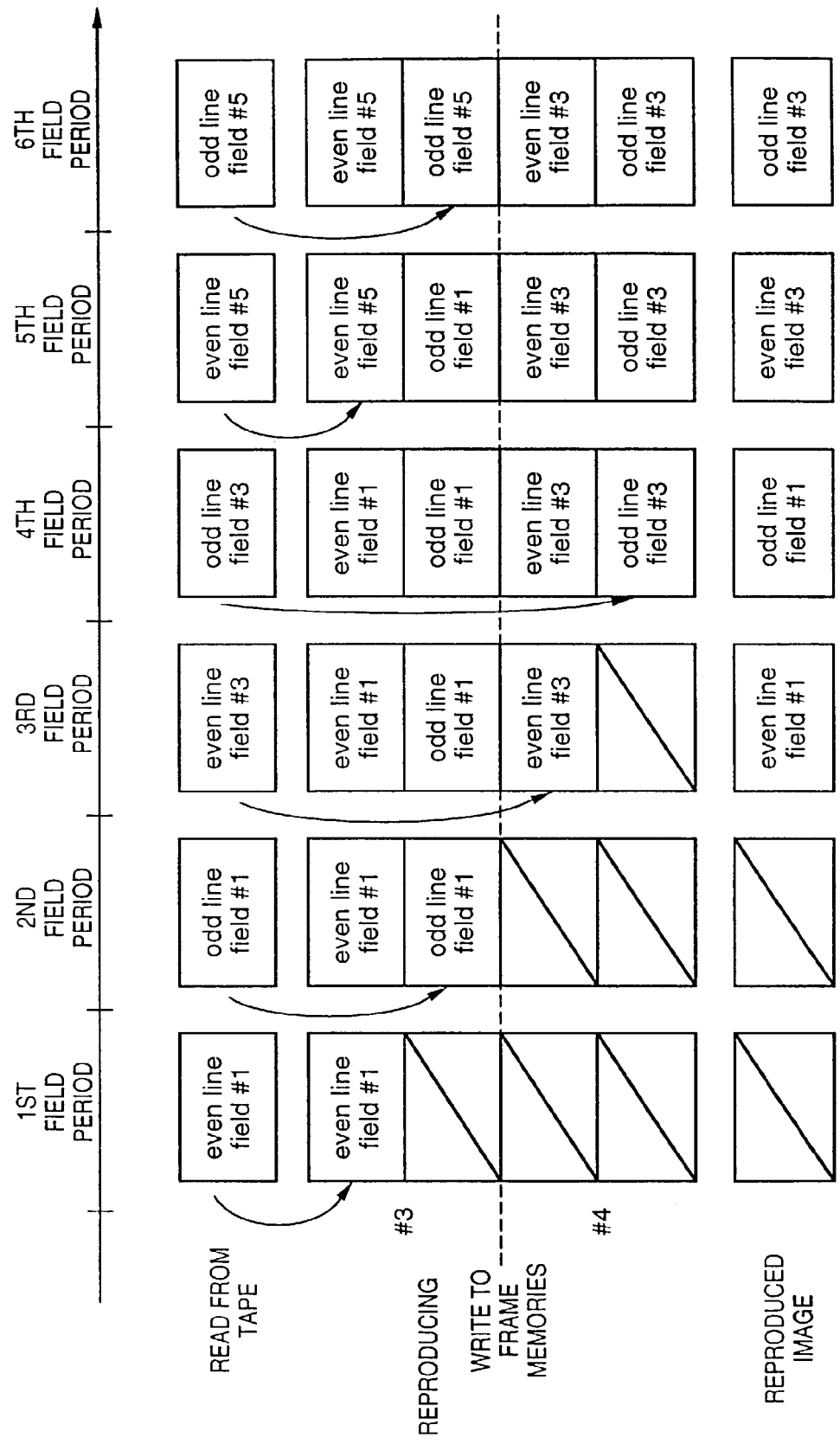
Figure 10:
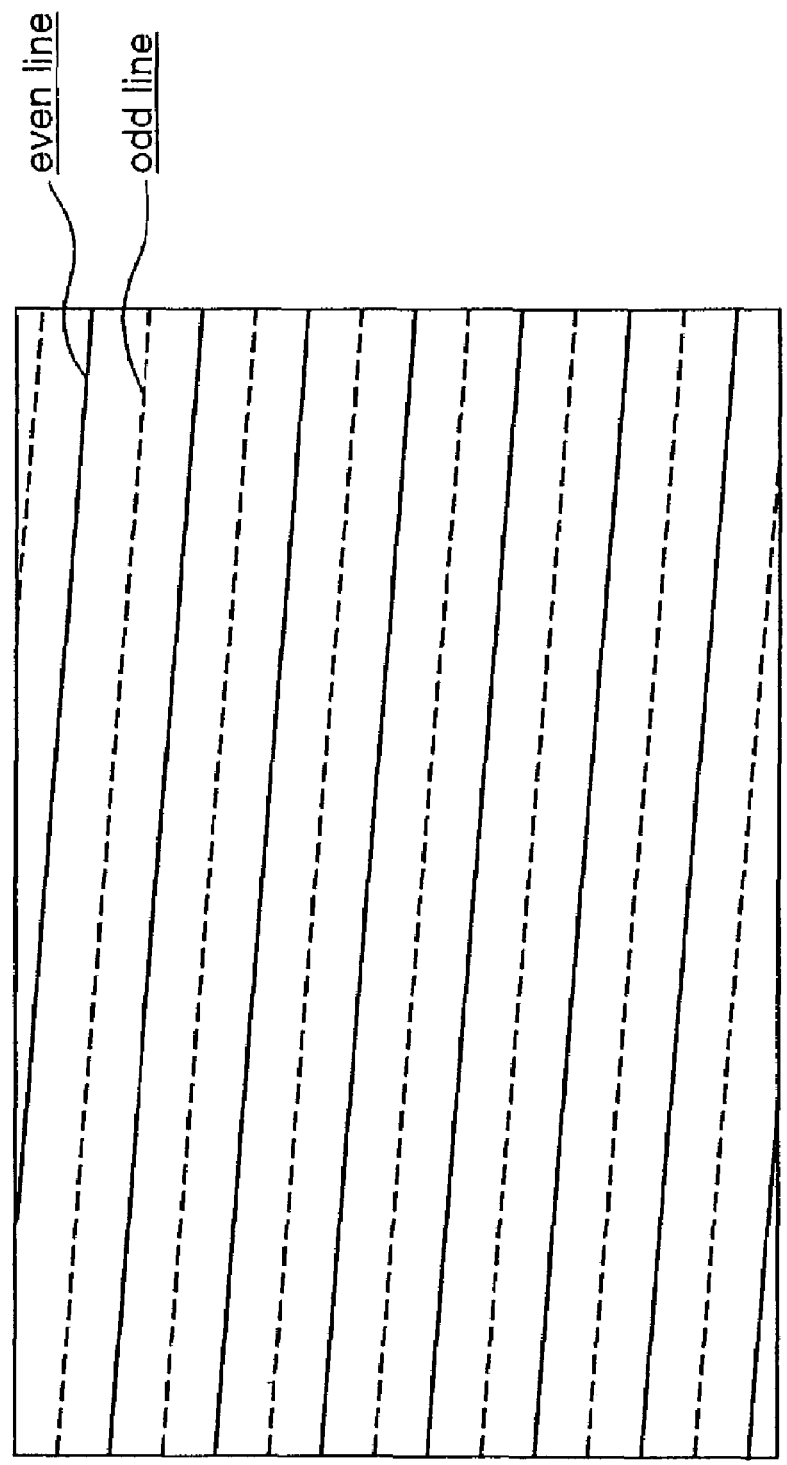
FIG. 10 is an explanatory view showing outputs from a non-interlace scanning type image sensing device.
Figure 11:
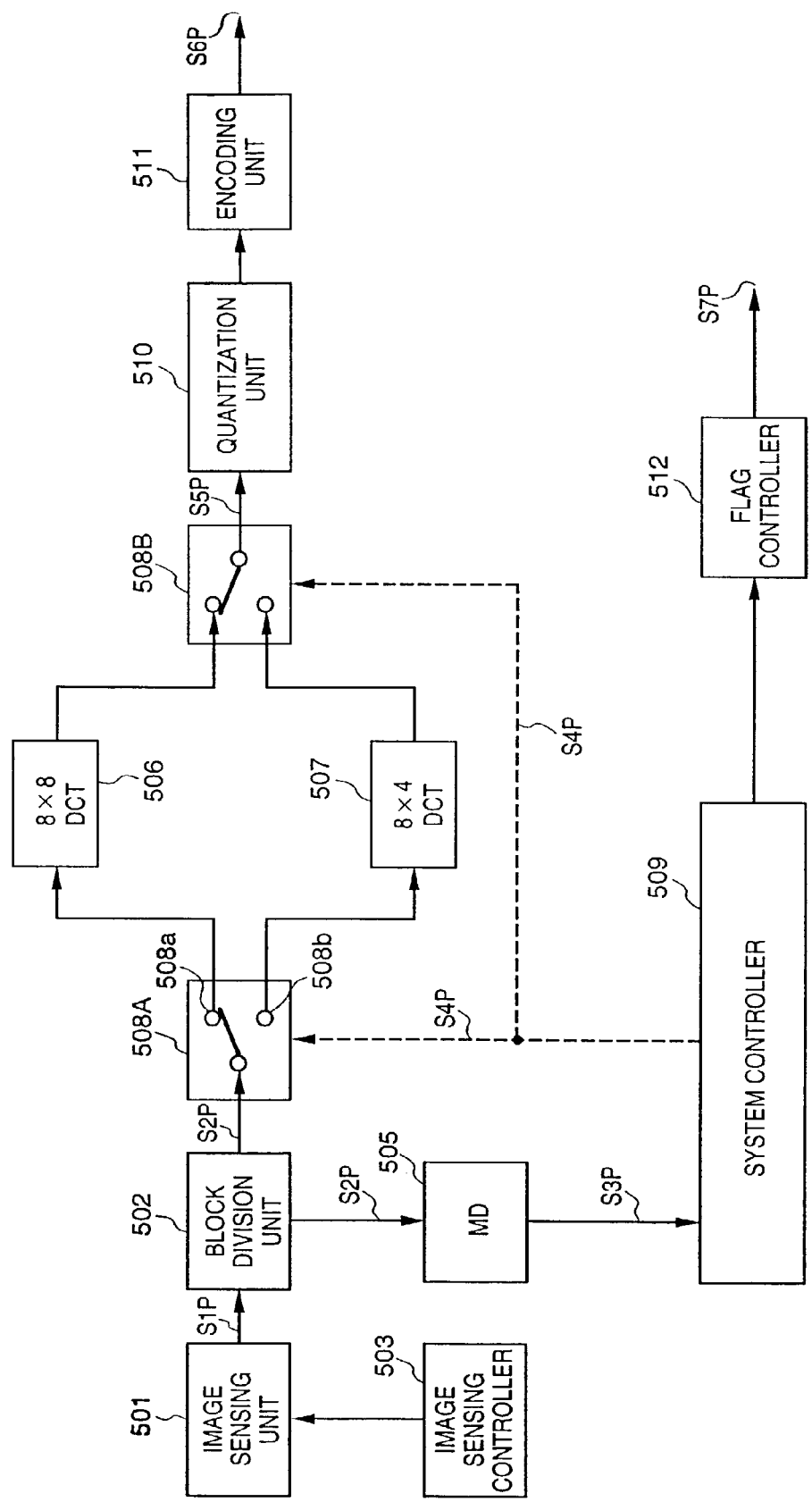
FIG. 11 is a block diagram illustrating a configuration of a conventional image sensing apparatus.

Further, when both the control signal S1 and the sub-cord signal S2 show the frame image sensing mode, in the recording operation, the processes in the frame image sensing mode explained in the background of the invention with reference to FIG. 9A are performed, and the explanation of the processes are omitted.

Figure 3:
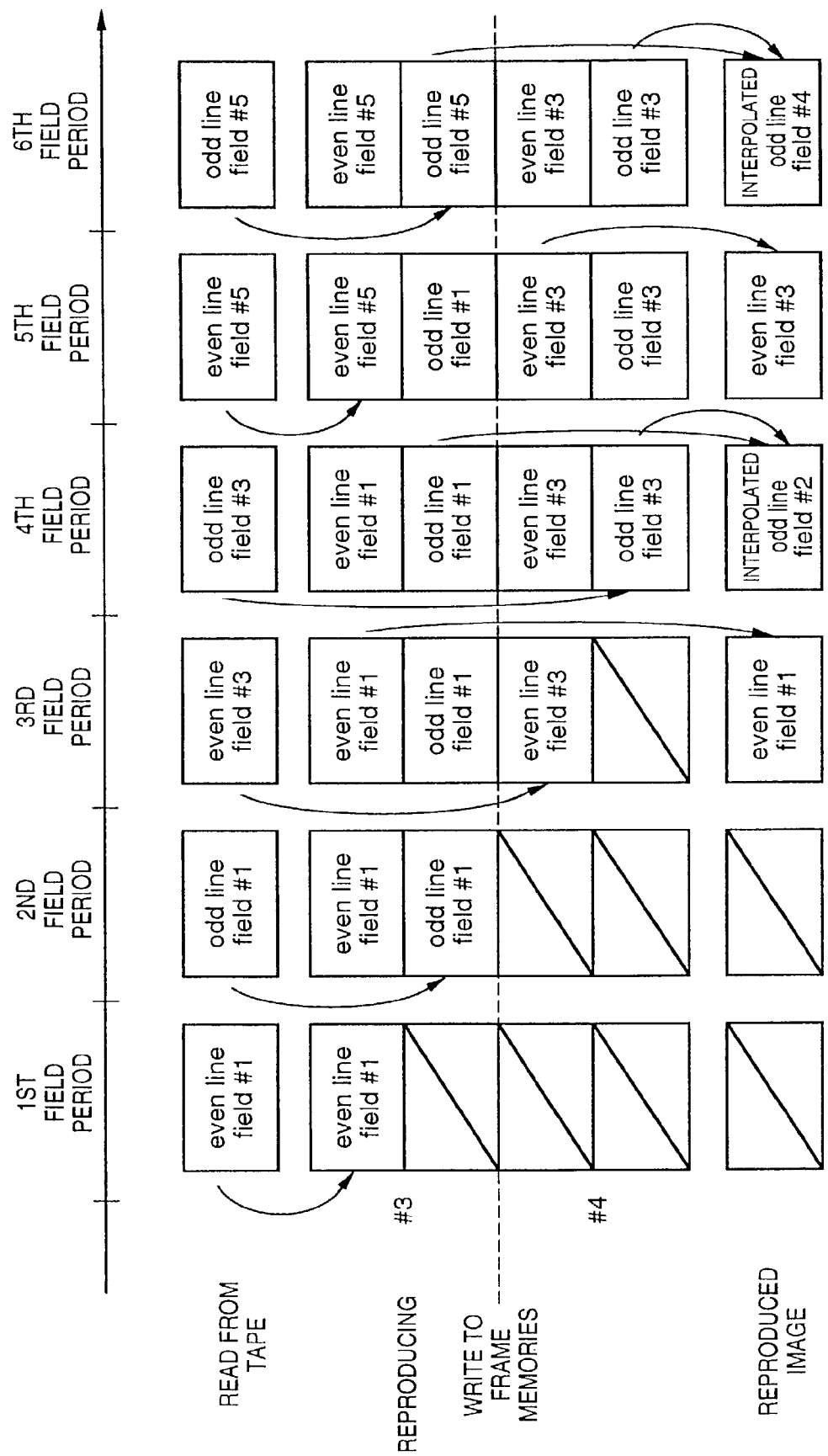
FIG. 3 is an explanatory view showing an operation of the image sensing apparatus according to the first embodiment.

The image signals recorded as shown in FIG. 9A are processed as shown in FIG. 3 upon reproducing the images when the control signal S1 and the sub-cord signal S2 indicate the frame image sensing mode and the recorded images are to be reproduced as a moving image.

First, image signals obtained from the magnetic tape 9 by the read head 10 are transmitted to the decoding processing circuit 11 where the signals are applied with I-DCT, deshuffling, and so on, in the first and second frame periods, then written to the third frame memory 121 in accordance with the control signal C3.

Meanwhile, if image data is written in a fourth frame memory 122, the decoding processing circuit 11 reads image data from the fourth memory 122 in accordance with the control signal C4, and reproduces an image by an even line field and an odd line field separately.

In the third and fourth field periods, the image signals read from the magnetic tape 9 by the read head 10 are transmitted to the decoding processing circuit 11 where the image signals are applied with the I-DCT, deshuffling, and so on, then written to the fourth frame memory 122.

Meanwhile, the decoding processing circuit 11 reads image data from the third memory 121 in accordance with the control signal C3, and reproduces an image of the even line field and the odd line field separately.

A linear interpolation circuit 13 receives the image signals reproduced as described above, and controls the ON and OFF state of the interpolation filter which interpolates field images between consecutive frame images sensed at different times in accordance with a control signal S3. In the example shown in FIG. 3, a reproduced image signal is first outputted in the third field period. In this field period, the interpolation filter is turned OFF in accordance with the control signal S3, and even line field image data of the frame image #1 is outputted sequentially from the third frame memory 121.

In the fourth field period, the interpolation filter is turned ON in accordance with the control signal S3, and the linear interpolation circuit 13 generates image data interpolated between frame images #1 and #3 on the basis of the odd line field image data of the frame image #1 stored in the third frame memory 121 and the odd line field image data of the frame image #3 stored in the fourth frame memory 122. With this interpolation, field image data of a field image which is virtually generated during a time period between the sensing of a given frame image and the next sensing of the frame image (virtual odd line field data, frame image #2).

In the fifth field period, the interpolation filter is turned OFF in accordance with the control signal S3, and the even line field data of the frame image #3 are sequentially read from the fourth frame memory 122.

In the sixth field period, the interpolation filter is turned ON in accordance with the control signal S3, and the linear interpolation circuit 13 generates image data interpolated between frame images #3 and #5 on the basis of the odd line field image data of the frame image #3 stored in the fourth frame memory 122 and the odd line field image data of the frame image #5 stored in the third frame memory 122. With this interpolation, field image data of a field image which is virtually sensed during a time period between when a given frame image is sensed and when the next frame image is sensed (virtual odd line field data, frame image #4).

By interpolating field images between consecutive frame images as described above in every other field period, time gaps between images are filled and a moving image looks continuing smoothly. Thus, it is possible to obtain a smooth moving image even though the moving image is reproduced on the basis of still images.

Further, in order to output image signals from a video printer as a still image, the linear interpolation circuit 13 controls interpolation filter so as to ignore the control signal S3. By doing so, it is possible to output the still image directly.

Note, two frame memories are used as image memories for reproducing images in the first embodiment, since it is assumed that deshuffling is performed by frame. Therefore, if deshuffling is performed by field, the image memories can be used only for configuring the interpolation filter, thereby it is possible to configure the image sensing apparatus by using two field memories for reproduction.

Further, a linear field interpolated image is generated on the basis of field image data of two consecutive frame images, however, by using image data of a greater number of fields, it is possible to generate a more natural field interpolated image.

According to the first embodiment as described above, a sub-cord signal showing whether image signals recorded on a recording medium are sensed in the field image sensing mode or in the frame image sensing mode is recorded in a sub-cord recording area of the recording medium. Therefore, by applying predetermined processes on the image signals reproduced from the recording medium on the basis of the sub-cord signal, it is possible to reproduce a natural moving image of high time resolution.

More precisely, an interpolation filter which interpolates field images between consecutive frame images sensed at different times in accordance with the sub-cord signal stored in the sub-cord recording area of the recording medium and an interpolation filter controller for controlling ON/OFF of the interpolation filter are provided, and since the interpolation filter controller turns on the interpolation filter when the sub-cord signal indicates that the frame image sensing mode and a moving image output is requested, it is possible to obtain a natural moving image of high resolution even if all the image data recorded on the recording medium are sensed in the frame image sensing mode which is basically for sensing still image.

Second Embodiment

A second embodiment of the present invention will be described with reference to drawings.

Figure 4:
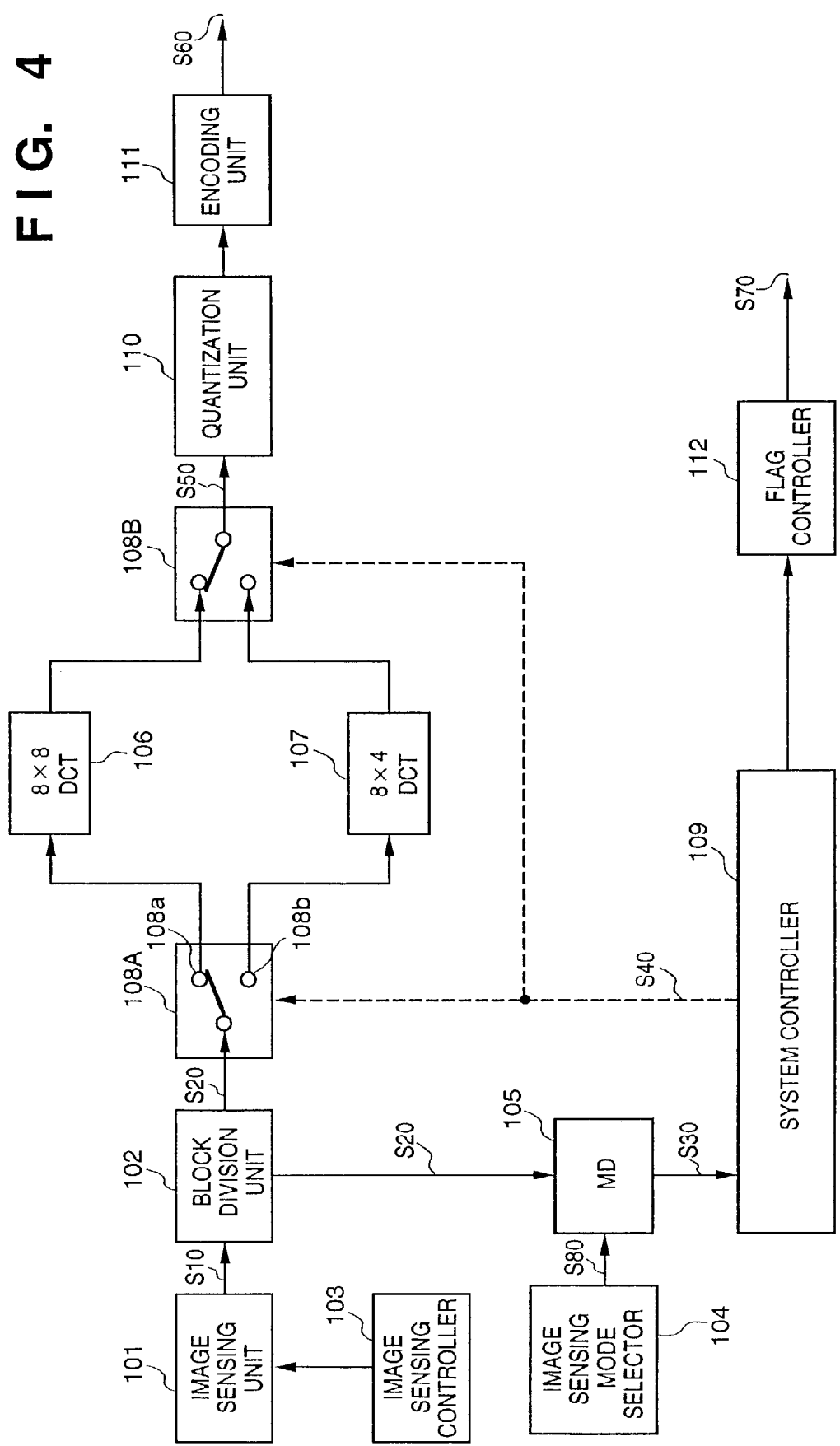
FIG. 4 is a block diagram illustrating a configuration of an image sensing apparatus according to the second embodiment of the present invention.

FIG. 4 is a block diagram illustrating a brief configuration of an image sensing apparatus according to the second embodiment of the present invention.

In FIG. 4, reference numeral 101 denotes an image sensing unit having a so-called progressive or non-interlace scanning type CCD. A focus, zooming ratio, light exposure, and so on, of the image sensing unit 101 is controlled by the image sensing controller 103, and the image sensing unit 101 outputs known digital standard image signals S10, e.g., parallel data conforming with SMPTE (Society of Motion Picture and Television Engineers) 125M.

The block division unit 102 divides the digital image data S10 into blocks consisting of a plurality of pixels, further applies processes, such as shuffling and noise reduction, on the divided digital image data.

The image data S20 divided into a plurality of blocks by the block division unit 102 is provided to a motion detector (MD) 105.

Reference numeral 104 denotes an image sensing mode selector which outputs an image sensing mode signal S80, showing whether an image sensing mode performed by using the image sensing unit 101 is a moving image mode or a still image mode, to the MD 105. The image sensing mode signal S80 is "H" to indicate the moving image mode and "L" to indicate the still image mode, in the second embodiment.

The MD 105 detects differences between fields of a block image on the basis of the input image data S20, for example, and determines movement in a block image on the basis of the differences and the image sensing mode signal S80 inputted from the image sensing mode selector 104. Further, it generates movement determination information S30 and outputs it to a system controller 109. In the second embodiment, when the MD 105 determines that there is movement in the input data S20, the movement determination information S30 is "H", whereas when the MD 105 determines that there is no movement in the input data S20, the movement determination information S30 is "L".

Reference numerals 106 and 107 denote discrete cosine transform (DCT) units which compress information by using correlation between the image data of neighboring pixels. The first DCT unit 106 performs DCT on image data by pixel block, e.g., by 8×8 pixel block.

Further, the second DCT unit 107 performs DCT on image data by pixel block, e.g., by 8×4 pixel block for an odd field and by 8×4 pixel block for an even field.

The system controller 109 outputs a switching signal S40 in accordance with the movement determination information S30, thereby controls a switch 108A to switch between the first DCT unit 106 and the second DCT unit 107.

In the second embodiment, in a case where no movement is detected in the block image data S20, i.e., movement determination information S30 is "L", the switch 108A switches to the terminal 108a. In contrast, in a case where movement is detected in the block image data S20, i.e., movement determination information S30 is "H", the switch 108A switches to the terminal 108b. Thus, DCT processes can be switched between the one for a frame image and the one for a field image in accordance with the movement determination information S30.

In a case where there is a big movement in the block image data S20, since correlation between fields is low, vertical components of the DCT coefficients reach high frequency range if an image is processed as a frame image, and encoding efficiency drops extremely.

Therefore, when the movement determination information S30 is "H", it is controlled so that odd line field image data and even line field image data are separately applied with orthogonal transformation. As described above, by properly switching the DCT between the one for a frame image and the one a field image in accordance with a state, "H" or "L" shown by the movement determination information S30, effective encoding is performed.

Image data S50 processed with the DCT by the first DCT unit 106 or the second DCT unit 107 is quantized by a quantization unit 110. Processes in each step of quantization are adjusted in accordance with the precision of the image data, and an image of low frequency is quantized closely, whereas an image of high frequency is quantized roughly.

The encoding unit 111 scans the block data arranged in two dimensions in zig-zag scanning from the low space frequency portion to the high space frequency portion to obtain linear data, encodes zero coefficients by run-length coding and non-zero coefficients by two dimensional Huffman coding into variable length codes, then outputs encoded data S60.

In the run-length coding, image data is applied with lossless compression in accordance with a zero-run count. In the Huffman coding, short codes are assigned to data whose occurrence probability is high, whereas long codes are assigned to data whose occurrence probability is low, thereby shortening the total code length.

A flag controller 112 is for generating a system information flag S70 used for writing information outputted from the system controller 109 to a recording medium.

Figure 5:
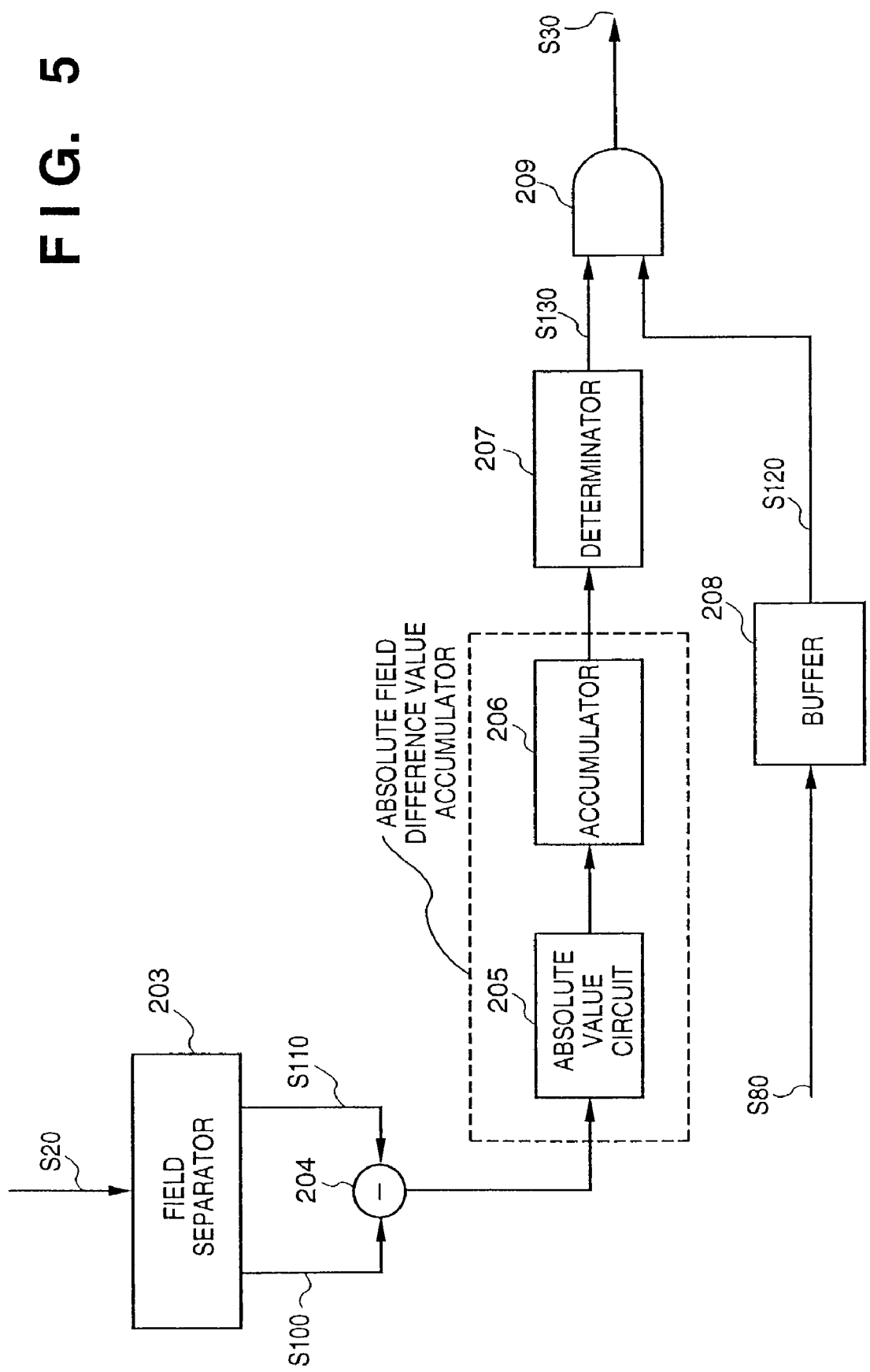
FIG. 5 is a block diagram illustrating an example of a configuration of movement detector.

FIG. 5 is a block diagram illustrating an example of a configuration of the MD 105. In FIG. 5, reference numeral 203 denotes a field separator which reads block image data from a memory (not shown) and outputs odd line field data S100 and even line field data S110.

Reference numeral 205 denotes a subtractor for taking differences between the field data S100 and S110, and it serves as a difference data operator.

Reference numeral 205 denotes an absolute value circuit; 206, an accumulator; and 207, a determinator. The absolute value circuit 205 and the accumulator 206 consist an absolute field difference value accumulator.

Further, the image sensing mode signal S80 outputted from the image sensing mode selector 104 enters a buffer circuit 208, and outputted to an AND circuit 209 as an image sensing mode signal S120. The AND circuit 209 is provided as movement information generator and outputs the movement determination information S30 as the image sensing mode signal S120 and the determination result S130 from the determinator 207 are inputted.

Figure 13:
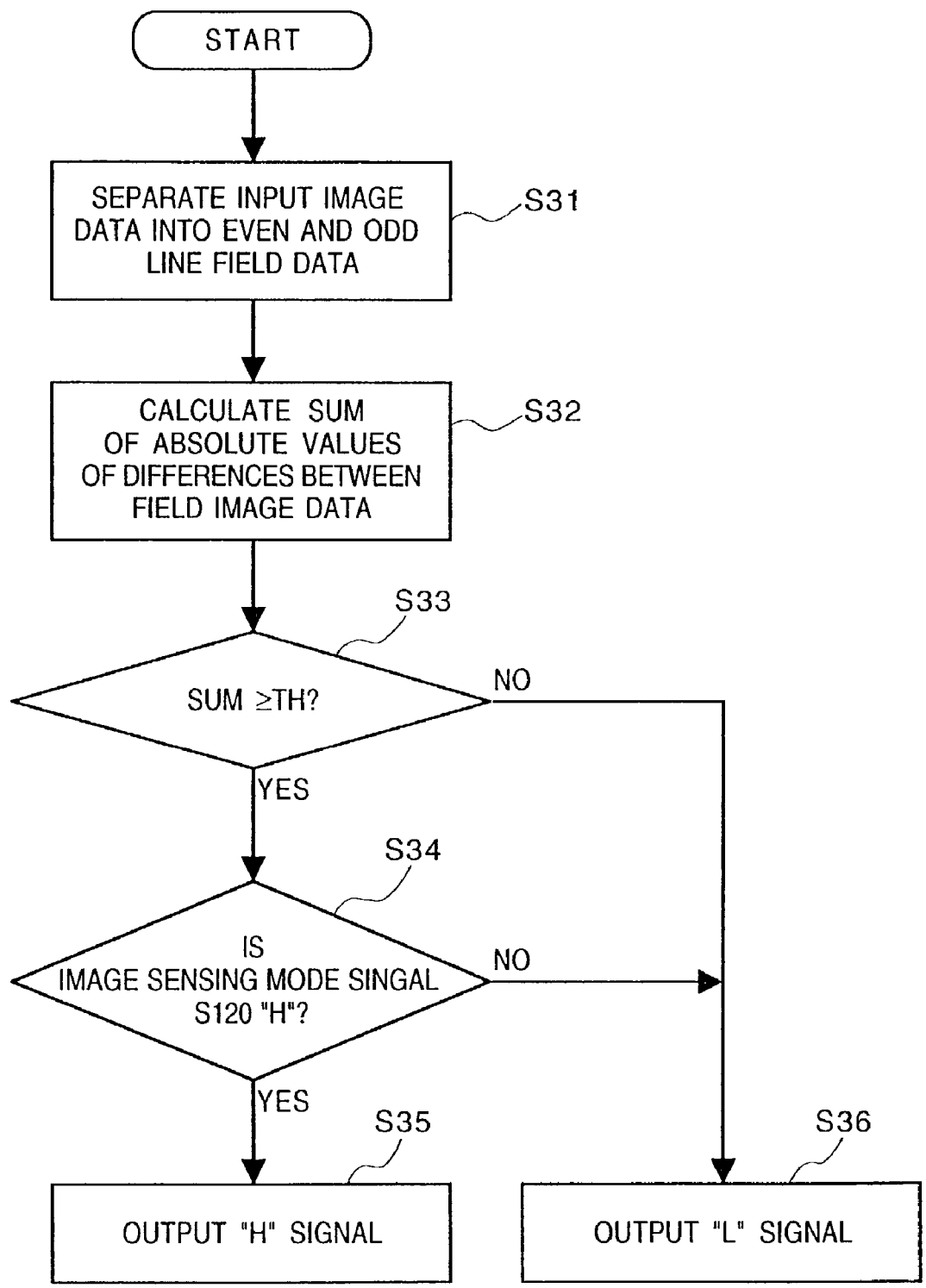
FIG. 13 is a flowchart showing an operation of the movement detector according to the second embodiment of the present invention.

Next, an operation of the MD 105 having the aforesaid configuration will be explained with reference to FIG. 13. The image data S20 which is divided into blocks by the block division circuit 102 is further separated into the odd line field data S100 and the even line field data S110 by the field separator 203 (step S31). These field data S100 and S110 enter the subtractor 204.

Then, difference data between the even and odd line field data is calculated by the subtractor 204. The difference data is inputted to the absolute value circuit 205 then to the accumulator 206, thereby the sum of absolute values of differences between field data of a block image is obtained (step S32). Further, the sum of the absolute values of differences between field data is inputted to the determinator 207 where the sum is compared to a predetermined threshold (step S33). Accordingly, movement in the block image data is determined.

As the determination result, when the sum of absolute values of differences between field data is greater than the threshold (YES at step S33), it is determined that there is movement between fields of the block image data. Whereas, if the sum is less than or equal to the threshold (NO at step S33), it is determined that there is no movement between two field image data of the block image. The determined result is outputted to the AND circuit 209 as a determination result information S130.

Meanwhile, the image sensing mode signal S80 is delayed for the same time period as that required for determining movement by the buffer circuit 208 which is for delaying the signal, thereafter, outputted to the AND circuit 209 as the image sensing mode signal S120. The AND circuit 209 performs logical AND operation on the determination result information S130 inputted from the determinator 207 and the image sensing mode signal S120 inputted from the buffer circuit 212.

Then, when the logic value of the image sensing mode signal S120 is "L", i.e., when showing the still image mode (NO at step S34), the movement determination information S30 is outputted as "L" indicating no movement in the block image, regardless of the state of the determination result information S130. Whereas, when the logic value of the image sensing mode signal S12 is "H", i.e., when showing the moving image mode (YES at step S34), the state of the determination result information S130 becomes the state of the movement determination information S30.

Figure 6:
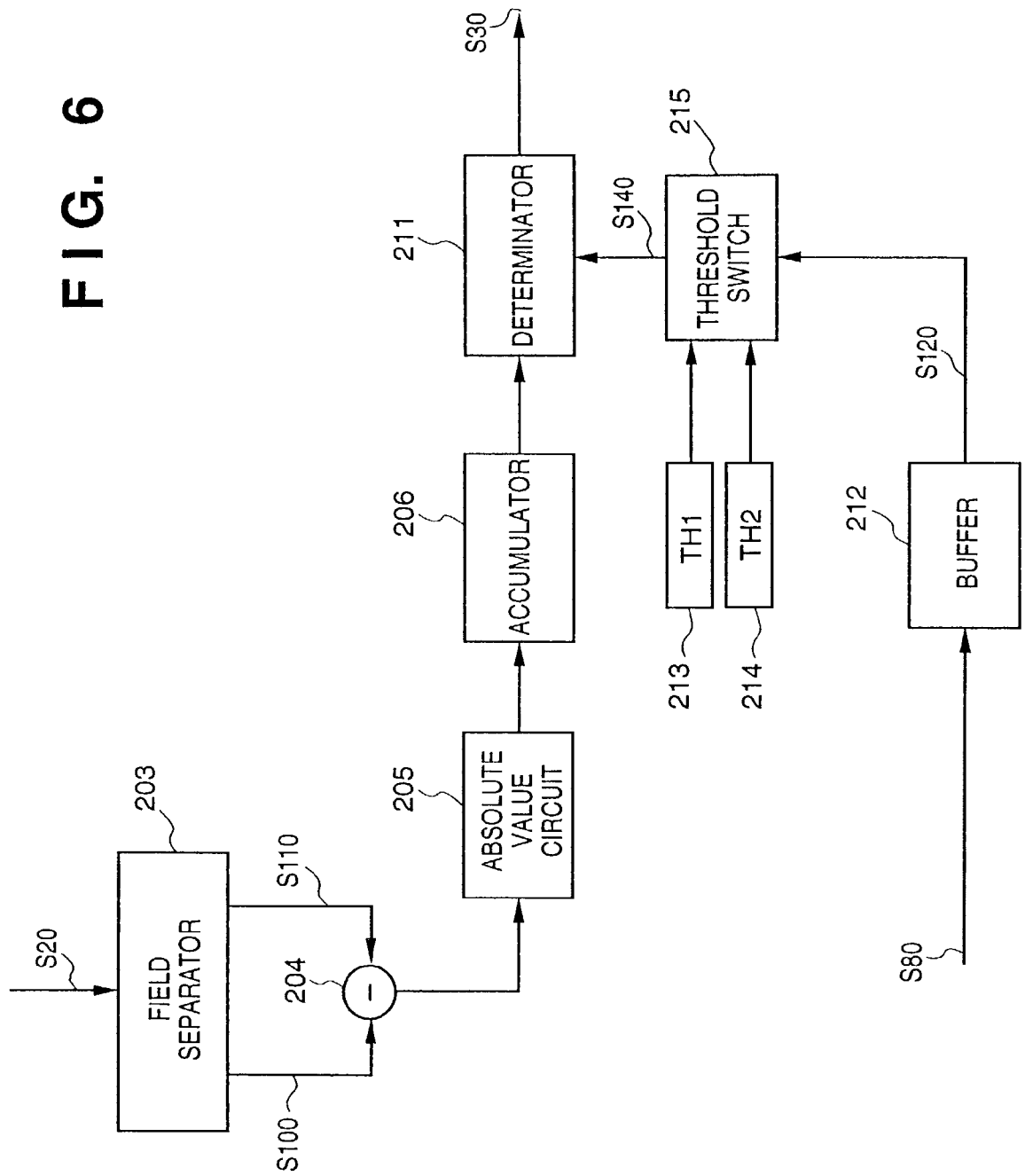
FIG. 6 is a block diagram illustrating another example of a configuration of movement detector.

Next, a block diagram of other configuration of the MD 105 is shown in FIG. 6. Note, the same units and elements as those in FIG. 5 are referred by the same reference numerals, and explanation of those are omitted.

In FIG. 6, reference numeral 211 denotes a determinator, and reference numeral 213 and 214 denote thresholds used for movement determination. In the following explanation, the first threshold TH1 is less than the second threshold TH2.

Reference numeral 212 denotes a buffer circuit which outputs image sensing mode signal S120 corresponding to the input image sensing mode signal S80. Reference numeral 215 denotes a threshold switch which switches between the first threshold TH1 and the second threshold TH2 in accordance with the image sensing mode signal S120 outputted from the buffer circuit 212, and selectively outputs either of the thresholds.

Figure 14:
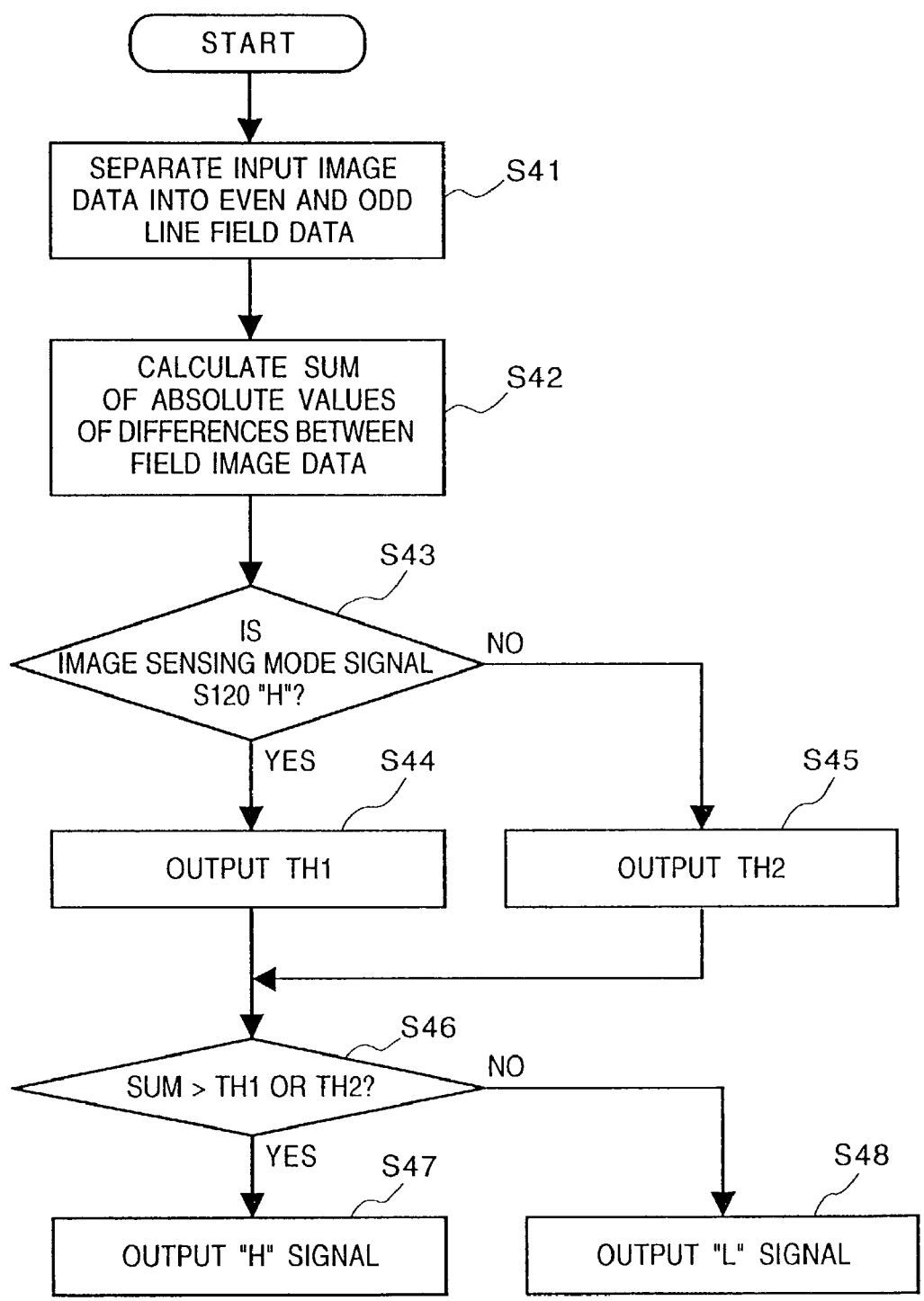
FIG. 14 is a flowchart showing an operation of another movement detector according to the second embodiment of the present invention.

Next, an operation of the MD 105 will be explained with reference to FIG. 14. The image data divided into blocks is further separated into odd line field data S100 and the even line field data S110 (step S41), then inputted to the subtractor 204.

The subtractor calculates differences between the two field image data. The calculated differences enter the absolute value circuit 204 then the accumulator 206, thereby, the sum of the absolute values of differences between field image data of the block image is obtained (step S42). The sum is inputted to the determinator 211 where it is compared to the threshold S140 which is inputted from the threshold switch 215 (step S46).

Meanwhile, the image sensing mode signal S80 is delayed for the same time period as that required for calculating the sum of the absolute values of differences between field data by the buffer circuit 212, thereafter, the image sensing mode signal S120 is outputted to the threshold switch 215.

In the aforesaid threshold switch 215, when the logic value of the image sensing mode signal S120 is "H", i.e., when showing the moving image mode (YES at step S43), the first threshold TH1 is outputted as the threshold S140 for determination to the determinator 211 (step S44).

On the other hand, when the logic value of the image sensing mode signal S120 is "L", i.e., when showing the still image mode (NO at step S43), the second threshold TH2 is outputted as the threshold S140 for determination to the determinator 211 (step S45).

The determinator 211 compares the sum of the absolute values of differences between field data to the threshold S140. If the sum is greater than the threshold S140 (YES at step S46), then it is determined that there is movement between field image data of the block image (step S47).

Further, if the sum is less than or equal to the threshold S140 (NO at step S46), it is determined that there is no movement between field image data of the block image, then outputs the corresponding movement determination information S30 (step S48).

Here, the first threshold TH1 is less than the second threshold TH2, i.e., the threshold for the still image mode is greater than the threshold for the moving image mode. Accordingly, it is possible to determine movement in the still image mode more precisely.

According to the second embodiment as described above, movement determination is performed differently in accordance with the image sensing mode of the image sensing unit, namely, depending upon whether an image is sensed in the moving image mode or the still image mode. Therefore, it is possible to obtain more precise movement determination information with less error in both the image sensing modes, namely, the moving image mode and the still image mode. As a result, it is possible to prevent the encoding efficiency from dropping caused by misdetection of movement especially during encoding a still image of high precision obtained by non-interlace scanning.

Further, according to the other advantage of the second embodiment, a threshold used by the movement detector is set in accordance with the image sensing mode, thereby it is possible to record a still image of high precision under the same condition for recording moving image by using limited hardware.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:
   image sensing means for generating image signals by sequentially reading all the pixels of said image sensing means in non-interlace scanning in one field period;
   image sensing mode selection means for selecting an image sensing mode performed by said image sensing means out of a plurality of image sensing modes; and
   movement determination means for performing movement determination processes in accordance with the image sensing mode selected by said image sensing mode selection means,
   wherein said movement determination means comprises:
   field separation means for separating input image data into even line field data and odd line field data;
   difference calculation means for calculating field difference data between the even line field data and the odd line field data outputted by said field separation means;
   accumulation means for calculating a sum of the absolute values of the field difference data outputted by said difference calculation means;
   movement detection means for detecting movement between the even line field data and the odd line field data by comparing the sum of the absolute values of the field difference data calculated by said accumulation means to a predetermined threshold; and
   movement information generation means for generating movement information signal on the basis of the detection result detected by said movement detection means and the image sensing mode selected by said image sensing mode selection means.

2. The image sensing apparatus according to claim 1, wherein said plurality of image sensing modes include a moving image sensing mode and a still image sensing mode, and, when the still image sensing mode is selected by said image sensing mode selection means, said movement information generation means outputs movement information signal indicating no movement in the input image data regardless of the detected result by said movement detection means, and when the moving image sensing mode is selected by said image sensing mode selection means, if said movement detection means detects movement between the even line field data and the odd line field data, said movement information generation means outputs movement information signal indicating movement in the input data, whereas, if said movement detection means detects no movement between the even line field data and the odd line field data, said movement information generation means output movement information signal indicating no movement in the input data.

3. The image sensing apparatus according to claim 1, wherein said movement detection means detects movement between the even line field data and the odd line field data if the sum of the absolute values of the field difference data calculated by said accumulation means is greater or equal to the predetermined threshold, and detects no movement between the even line field data and the odd line field data if the sum of the absolute values of the field difference data calculated by said accumulation means is less the predetermined threshold.

4. An image sensing apparatus comprising:
   image sensing means for generating image signals by sequentially reading all the pixels of said image sensing means in non-interlace scanning in one field period;
   image sensing mode selection means for selecting an image sensing mode performed by said image sensing means out of a plurality of image sensing modes; and movement determination means for performing movement determination processes in accordance with the image sensing mode selected by said image sensing mode selection means, wherein said movement determination means comprises:

field separation means for separating input image data into even line field data and odd line field data;

difference calculation means for calculating field difference data between the even line field data and the odd line field data outputted by said field separation means;

accumulation means for calculating a sum of the absolute values of the field difference data outputted by said difference calculation means;

threshold switch means for outputting one of a plurality of thresholds on the basis of the image sensing mode selected by said image sensing mode selection means; and movement information generation means for detecting movement in the input image data by comparing the sum of the absolute values of the field difference data calculated by said accumulation means to the threshold inputted by said threshold switch means and generating movement information signal on the basis of a detection result.

5. The image sensing apparatus according to claim 4, wherein said plurality of image sensing modes include a moving image sensing mode and a still image sensing mode, and a threshold selected by said threshold switch means when the still image sensing mode is selected by said image sensing selection mode is greater than a threshold selected when the moving image sensing mode is selected.

6. The image sensing apparatus according to claim 4, wherein said movement information generation means determines movement between the even line field data and the odd line field data when the sum of the absolute values of the field difference data calculated by said accumulation means is greater or equal to the threshold given by said threshold switch means, and determines no movement between the even line field data and the odd line field data when the sum of the absolute values of the field difference data calculated by said accumulation means is less than the threshold.

7. Movement detection method for detecting movement in an image having a plurality of fields, comprising:

field separation step of separating input image data into even line field data and odd line field data;

difference calculation step of calculating field difference data between the even line field data and the odd line field data outputted at said field separation step;

accumulation step of calculating a sum of the absolute values of the field difference data outputted at said difference calculation step;

image sensing mode selection step of selecting an image sensing mode;

movement detection step of detecting movement between the even line field data and the odd line field data by comparing the sum of the absolute values of the field difference data calculated at said accumulation step to a predetermined threshold; and movement information generation step of generating movement information signal on the basis of the detection result detected at said movement detection step and the image sensing mode selected at said image sensing mode selection step.

8. Movement detection method for detecting movement in an image having a plurality of fields, comprising:

field separation step of separating input image data into even line field data and odd line field data;

difference calculation step of calculating field difference data between the even line field data and the odd line field data outputted at said field separation step;

accumulation step of calculating a sum of the absolute values of the field difference data outputted at said difference calculation step;

image sensing mode selection step of selecting an image sensing mode;

threshold switch step of outputting one of a plurality of thresholds on the basis of the image sensing mode selected at said image sensing mode selection step; and movement information generation step of detecting movement in the input image data by comparing the sum of the absolute values of the field difference data calculated at said accumulation step to the threshold inputted at said threshold switch step and generating movement information signal on the basis of a detection result.

* * * * *